(12) United States Patent
Laredo

(10) Patent No.: US 9,012,581 B2
(45) Date of Patent: Apr. 21, 2015

(54) OPHTHALMIC AND OTORHINOLARYNGOLOGICAL DEVICE MATERIALS

(75) Inventor: Walter R. Laredo, Fort Worth, TX (US)

(73) Assignee: Novartis AG, Basel (CH)

( * ) Notice: Subject to any disclaimer, the term of this patent is extended or adjusted under 35 U.S.C. 154(b) by 760 days.

(21) Appl. No.: 12/861,454

(22) Filed: Aug. 23, 2010

(65) Prior Publication Data

US 2011/0046258 A1    Feb. 24, 2011

Related U.S. Application Data

(60) Provisional application No. 61/236,402, filed on Aug. 24, 2009.

(51) Int. Cl.

| | |
|---|---|
| *C08L 33/04* | (2006.01) |
| *C08F 290/04* | (2006.01) |
| *C08F 290/12* | (2006.01) |
| *C08F 222/20* | (2006.01) |
| *C08F 220/28* | (2006.01) |
| *G02B 1/04* | (2006.01) |
| *C08F 290/06* | (2006.01) |
| *C08F 222/14* | (2006.01) |
| *C08L 33/08* | (2006.01) |
| *C08L 33/10* | (2006.01) |
| *C08L 33/12* | (2006.01) |
| *C08F 220/16* | (2006.01) |
| *C08F 220/26* | (2006.01) |
| *C08F 222/10* | (2006.01) |

(52) U.S. Cl.
CPC ........... *G02B 1/043* (2013.01); *C08F 2222/145* (2013.01); *C08F 2222/205* (2013.01); *C08L 33/08* (2013.01); *C08L 33/10* (2013.01); *C08L 33/12* (2013.01); *C08F 220/16* (2013.01); *C08F 220/26* (2013.01); *C08F 222/1006* (2013.01); *C08F 290/062* (2013.01); *Y10S 525/937* (2013.01); *Y10S 525/91* (2013.01)

(58) Field of Classification Search
CPC ........... C08F 290/062; C08F 2222/145; C08F 2222/205; C08L 33/08; C08L 33/10; C08L 33/12
USPC ........... 523/106; 526/259, 320; 525/451, 418, 525/910, 937
See application file for complete search history.

(56) References Cited

U.S. PATENT DOCUMENTS

| | | |
|---|---|---|
| 5,290,892 A | 3/1994 | Namdaran et al. |
| 5,331,073 A | 7/1994 | Weinschenk, III et al. |
| 5,470,932 A | 11/1995 | Jinkerson |
| 5,693,095 A * | 12/1997 | Freeman et al. ............. 623/6.56 |
| 6,353,069 B1 | 3/2002 | Freeman et al. |
| 6,528,602 B1 | 3/2003 | Freeman et al. |
| 6,653,422 B2 | 11/2003 | Freeman et al. |
| 7,091,283 B2 * | 8/2006 | Muller et al. ................. 525/292 |
| 2009/0088493 A1 | 4/2009 | Laredo et al. |
| 2009/0088544 A1 | 4/2009 | Laredo |
| 2009/0093592 A1 | 4/2009 | Schlueter |
| 2009/0093603 A1 | 4/2009 | Schlueter |
| 2009/0093604 A1 | 4/2009 | Schlueter |

FOREIGN PATENT DOCUMENTS

| | | |
|---|---|---|
| WO | WO0061646 A1 | 10/2000 |
| WO | 20060138213 | 12/2006 |
| WO | WO2007149083 A1 | 12/2007 |
| WO | WO2008011564 A3 | 1/2008 |
| WO | WO2008011566 A3 | 1/2008 |

\* cited by examiner

*Primary Examiner* — Ling Choi
*Assistant Examiner* — David L Miller
(74) *Attorney, Agent, or Firm* — Patrick M. Ryan

(57) ABSTRACT

Disclosed are soft, high refractive index, acrylic device materials. The materials contain a copolymeric additive for glistening resistance.

17 Claims, No Drawings

OPHTHALMIC AND OTORHINOLARYNGOLOGICAL DEVICE MATERIALS

CROSS-REFERENCE TO RELATED APPLICATIONS

This application claims priority under 35 U.S.C. §119 to U.S. Provisional Patent Application No. 61/236,402, filed Aug. 24, 2009, the entire contents of which are incorporated herein by reference.

FIELD OF THE INVENTION

This invention is directed to improved ophthalmic and otorhinolaryngological device materials. In particular, this invention relates to soft, high refractive index acrylic device materials that have improved glistening resistance.

BACKGROUND OF THE INVENTION

With the recent advances in small-incision cataract surgery, increased emphasis has been placed on developing soft, foldable materials suitable for use in artificial lenses. In general, these materials fall into one of three categories: hydrogels, silicones, and acrylics.

In general, hydrogel materials have a relatively low refractive index, making them less desirable than other materials because of the thicker lens optic necessary to achieve a given refractive power. Conventional silicone materials generally have a higher refractive index than hydrogels, but tend to unfold explosively after being placed in the eye in a folded position. Explosive unfolding can potentially damage the corneal endothelium and/or rupture the natural lens capsule. Acrylic materials are desirable because they typically have a high refractive index and unfold more slowly or controllably than conventional silicone materials.

U.S. Pat. No. 5,290,892 discloses high refractive index, acrylic materials suitable for use as an intraocular lens ("IOL") material. These acrylic materials contain, as principal components, two aryl acrylic monomers. The IOLs made of these acrylic materials can be rolled or folded for insertion through small incisions.

U.S. Pat. No. 5,331,073 also discloses soft acrylic IOL materials. These materials contain as principal components, two acrylic monomers which are defined by the properties of their respective homopolymers. The first monomer is defined as one in which its homopolymer has a refractive index of at least about 1.50. The second monomer is defined as one in which its homopolymer has a glass transition temperature less than about 22° C. These IOL materials also contain a cross-linking component. Additionally, these materials may optionally contain a fourth constituent, different from the first three constituents, which is derived from a hydrophilic monomer. These materials preferably have a total of less than about 15% by weight of a hydrophilic component.

U.S. Pat. No. 5,693,095 discloses foldable, high refractive index ophthalmic lens materials containing at least about 90 wt. % of only two principal components: one aryl acrylic hydrophobic monomer and one hydrophilic monomer. The aryl acrylic hydrophobic monomer has the formula

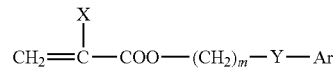

wherein:
X is H or $CH_3$;
m is 0-6;
Y is nothing, O, S, or NR, wherein R is H, $CH_3$, $C_nH_{2n+1}$ (n=1-10), iso-$OC_3H_7$, $C_6H_5$, or $CH_2C_6H_5$; and
Ar is any aromatic ring which can be unsubstituted or substituted with $CH_3$, $C_2H_5$, n-$C_3H_7$, iso-$C_3H_7$, $OCH_3$, $C_6H_{11}$, Cl, Br, $C_6H_5$, or $CH_2C_6H_5$.

The lens materials described in the '095 patent preferably have a glass-transition temperature ("$T_g$") between about −20 and +25° C.

Flexible intraocular lenses may be folded and inserted through a small incision. In general, a softer material may be deformed to a greater extent so that it can be inserted through an increasingly smaller incision. Soft acrylic or methacrylic materials typically do not have an appropriate combination of strength, flexibility and non-tacky surface properties to permit IOLs to be inserted through an incision as small as that required for silicone IOLs.

Polyethylene glycol (PEG) dimethacrylates are known to improve glistening resistance of hydrophobic acrylic formulations. See, for example, U.S. Pat. Nos. 5,693,095; 6,528, 602; 6,653,422; and 6,353,069. Both the concentration and molecular weight of PEG dimethacrylates have an impact on glistening performance. Generally, use of higher molecular weight PEG dimethacrylates (1000 MW) yield copolymers with improved glistening performance at low PEG concentrations (10-15 wt %), as compared to lower molecular weight PEG dimethacrylates (<1000 MW). However, low PEG dimethacrylate concentrations are desirable to maintain a high refractive index copolymer. Addition of PEG dimethacrylates also tends to decrease the modulus and tensile strength of the resulting copolymer.

SUMMARY OF THE INVENTION

Improved soft, foldable acrylic device materials which are particularly suited for use as IOLs, but which are also useful as other ophthalmic or otorhinolaryngological devices, such as contact lenses, keratoprostheses, corneal rings or inlays, otological ventilation tubes and nasal implants, have been discovered. These polymeric materials comprise copolymer additives that allow synthesis of glistening resistant, low equilibrium water content, high refractive index IOLs. The polymeric materials of the present invention have low haze, low tack, and mechanical properties suitable for use in IOLs designed to be injected through small incisions.

DETAILED DESCRIPTION OF THE INVENTION

Unless indicated otherwise, all component amounts are presented on a % (w/w) basis ("wt. %").

The device materials of the present invention are copolymers comprising a) a monofunctional acrylate or methacrylate monomer [1], b) a difunctional acrylate or methacrylate cross-linker [2], and c) a copolymer additive [3]. The device materials may contain more than one monomer [1], more than one monomer [2], and more than one copolymer additive [3]. Unless indicated otherwise, references to each ingredient are intended to encompass multiple components of the same formula and references to amounts are intended to refer to the total amount of all components of each formula.

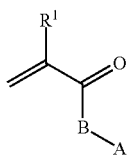

wherein
B=—O(CH$_2$)$_n$—, —(OCH$_2$CH$_2$)$_n$—, —NH(CH$_2$)$_n$—, or —NCH$_3$(CH$_2$)$_n$—;
R$^1$=H, CH$_3$, CH$_2$CH$_3$, or CH$_2$OH;
n=0-12;
A=C$_6$H$_5$ or O(CH$_2$)$_m$C$_6$H$_5$, where the C$_6$H$_5$ group is optionally substituted with —(CH$_2$)$_n$H, —(CH$_2$)$_n$H, —CH(CH$_3$)$_2$, —C$_6$H$_5$, —OC$_6$H$_5$, —CH$_2$C$_6$H$_5$, F, Cl, Br, or I; and
m=0-18;

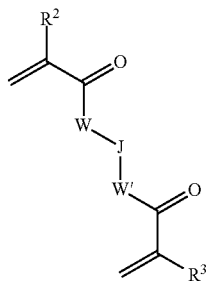

wherein
R$^2$, R$^3$ independently=H, CH$_3$, CH$_2$CH$_3$, or CH$_2$OH;
W, W' independently=O(CH$_2$)$_d$, NH(CH$_2$)$_d$, NCH$_3$(CH$_2$)$_d$, O(CH$_2$)$_d$C$_6$H$_4$, O(CH$_2$CH$_2$O)$_d$CH$_2$, O(CH$_2$CH$_2$O)$_d$CH$_2$, O(CH$_2$CH$_2$CH$_2$CH$_2$O)$_d$CH$_2$, or nothing;
J=(CH$_2$)$_a$, O(CH$_2$CH$_2$O)$_b$, O, or nothing, provided that if W and W'=nothing, then J≠nothing;
d=0-12;
a=1-12; and
b=1-24;

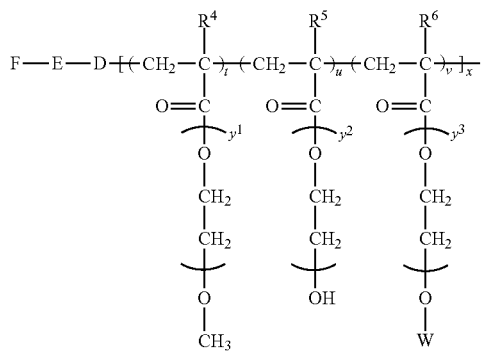

wherein
D=OCH$_2$CH$_2$S, SCH$_2$C=O, CH$_3$CH(OH)CH$_2$S, SCH$_2$CH(OH)CH$_2$O, S(CH$_2$)$_{11}$O, S(CH$_2$)$_{10}$C=O, S(CH$_2$)$_{14}$C=O, S(CH$_2$)$_{15}$C=O, SC$_6$H$_4$CH$_2$O, CH$_3$CH(S)C=O, S(CH$_2$CH$_2$CH$_2$)O, CH$_3$CH(S)CH(O)CH$_3$, OCH$_2$CH$_2$C(CH$_3$)$_2$S, SCH$_2$CH$_2$C=O, S(CH$_2$)$_4$O, SC$_6$H$_4$CH$_2$C=O, SC$_6$H$_4$C=O, S(CH$_2$)$_{11}$C=O, CH$_3$CH(O)CH(S)CH$_3$, SC$_6$H$_4$C=O, S(CH$_2$)$_6$OC$_6$H$_4$CH$_2$O, S(CH$_2$)$_6$O, S(CH$_2$)$_5$C=O, S(CH$_2$)$_7$C=O, S(CH$_2$)$_9$O, C(CH$_3$)$_2$C(=O)NHCH$_2$CH$_2$O, C(CH$_3$)$_2$C(=NH)NHCH$_2$CH$_2$C=O, C(CH$_3$)$_2$C(=O)NHCH(CH$_2$CH$_3$)(CH$_2$O), C(CH$_3$)$_2$CN, C(CH$_3$)(CN)CH$_2$C(OCH$_3$)(CH$_3$CH$_3$), C(CH$_3$)$_2$C(=O)NHCH$_2$CH=CH$_2$, C(CH$_3$)(CN)CH$_2$C(CH$_3$)$_2$(OCH$_3$), C(CH$_3$)(CN)CH$_2$CH(CH$_3$)$_2$, C(CH$_3$)$_2$C(=O)OCH$_3$, C(CH$_3$)(CN)CH$_2$CH$_3$, C(CN)(CH$_2$)$_5$, C(CH$_3$)$_2$C(=O)NHCH$_2$CH$_2$CH$_2$CH$_3$, or C(CH$_3$)$_2$C(=O)NHC$_6$H$_{11}$;
E=nothing, O(CH$_2$)$_n$NH, (OCH$_2$CH$_2$)$_n$NH, O(CH$_2$)$_n$NHC=O, HN(CH$_2$)$_n$NH, OH, or H; provided that if D=C(CH$_3$)$_2$CN, C(CH$_3$)(CN)CH$_2$C(OCH$_3$)(CH$_3$CH$_3$), C(CH$_3$)$_2$C(=O)NHCH$_2$CH=CH$_2$, C(CH$_3$)(CN)CH$_2$C(CH$_3$)$_2$(OCH$_3$), C(CH$_3$)(CN)CH$_2$CH(CH$_3$)$_2$, C(CH$_3$)$_2$C(=O)OCH$_3$, C(CH$_3$)(CN)CH$_2$CH$_3$, C(CN)(CH$_2$)$_5$, C(CH$_3$)$_2$C(=O)NHCH$_2$CH$_2$CH$_2$CH$_3$, or C(CH$_3$)$_2$C(=O)NHC$_6$H$_{11}$, then E=F=nothing;
n=1-5;
if E=H or OH, then F=nothing;
if E≠H or OH, then F=C(=O)C(CH$_3$)=CH$_2$, C(=O)CH=CH$_2$, C(=O)C(CH$_2$CH$_3$)=CH$_2$, C(=O)C(CH$_2$OH)=CH$_2$, C(=O)NHCH$_2$CH$_2$OC(=O)C(CH$_3$)=CH$_2$, or C(=O)NHC(CH$_3$)$_2$C$_6$H$_4$C(=CH$_2$)CH$_3$;
R$^4$, R$^5$, and R$^6$ independently=H or CH$_3$;
t, u, and v represent molar fraction values and t+u+v=1;
t and u independently=0-0.95; provided that t+u=0.8-0.95;
v=0.05-0.2;
W=H, CH$_3$, C(=O)C(CH$_3$)=CH$_2$, C(=O)CH=CH$_2$, C(=O)C(CH$_2$CH$_3$)=CH$_2$, C(=O)C(CH$_2$OH)=CH$_2$, C(=O)NHCH$_2$CH$_2$OC(=O)C(CH$_3$)=CH$_2$, or C(=O)NHC(CH$_3$)$_2$C$_6$H$_4$C(=CH$_2$)CH$_3$; provided that if F=nothing, then W=C(=O)C(CH$_3$)=CH$_2$, C(=O)CH=CH$_2$, C(=O)C(CH$_2$CH$_3$)=CH$_2$, C(=O)C(CH$_2$OH)=CH$_2$, C(=O)NHCH$_2$CH$_2$OC(=O)C(CH$_3$)=CH$_2$, or C(=O)NHC(CH$_3$)$_2$C$_6$H$_4$C(=CH$_2$)CH$_3$;
y$^1$, y$^2$, and y$^3$ independently=4-200; and
x=1-100.

Preferred monomers of formula [1] are those wherein:
B=—O(CH$_2$)$_n$— or —(OCH$_2$CH$_2$)$_n$—;
R$^1$=H or CH$_3$;
n=1-5;
A=C$_6$H$_5$, O(CH$_2$)$_m$C$_6$H$_5$; and
m=0-4.

Preferred monomers of formula [2] are those wherein:
R$^2$, R$^3$ independently=H or CH$_3$;
W, W' independently=O(CH$_2$)$_d$, O(CH$_2$)$_d$C$_6$H$_4$, or nothing;
J=O(CH$_2$CH$_2$O)$_b$ or nothing, provided that if W and W'=nothing, then J≠nothing;
d=0-6; and
b=1-10.

Preferred copolymer additives of formula [3] are those wherein:
D=OCH$_2$CH$_2$S or OCH$_2$CH$_2$CH$_2$S;
E=nothing, H, or OH;
if E=H or OH, then F=nothing;
if E≠H or OH, then F=C(=O)C(CH$_3$)=CH$_2$;
R$^4$=R$^5$=R$^6$=CH$_3$;
W=C(=O)C(CH$_3$)=CH$_2$;
t and u independently=0-0.95; provided that t+u=0.85-0.95;
v=0.05-0.15;
y$^1$, y$^2$, and y$^3$ independently=4-20; and
x=5-50

The copolymer additive [3] preferably has a number average molecular weight ($M_n$) from 3,000 to 10,000 Daltons relative to polystyrene standards.

Most preferred copolymer additives of formula [3] are those wherein:

D=OCH$_2$CH$_2$S;
E=nothing;
F=C(=O)C(CH$_3$)=CH$_2$;
R$^4$=R$^5$=R$^6$=CH$_3$;
W=C(=O)C(CH$_3$)=CH$_2$;
t and u independently=0-0.9; provided that t+u=0.85-0.9;
v=0.1-0.15;
y=4-20; and
x=5-50.

Monomers of formula [1] are known and can be made by known methods. See, for example, U.S. Pat. Nos. 5,331,073 and 5,290,892. Many monomers of formula [1] are commercially available from a variety of sources. Preferred monomers of formula [1] include benzyl methacrylate; 2-phenylethyl methacrylate; 3-phenylpropyl methacrylate; 4-phenylbutyl methacrylate; 5-phenylpentyl methacrylate; 2-phenoxyethyl methacrylate; 2-(2-phenoxyethoxy)ethyl methacrylate; 2-benzyloxyethyl methacrylate; 2-(2-(benzyloxy)ethoxy)ethyl methacrylate; and 3-benzyloxypropyl methacrylate; and their corresponding acrylates.

Monomers of formula [2] are known and can be made by known methods. Many are commercially available. Preferred monomers of formula [2] include ethylene glycol dimethacrylate; diethylene glycol dimethacrylate; triethylene glycol dimethacrylate; 1,6-hexanediol dimethacrylate; 1,4-butanediol dimethacrylate; 1,4-benzenedimethanol dimethacrylate; and their corresponding acrylates. Most preferred is 1,4-butanediol diacrylate.

Copolymer additives of formula [3] are statistical (random) copolymers and can be synthesized from poly(ethylene glycol) monomethyl ether methacrylate and hydroxyl terminated poly(ethylene glycol) methacrylate. The copolymer additives may be made using a 2-step 1-pot synthesis approach that makes scale-up possible and cost effective. For example, commercially available hydroxyl-terminated and methyl ether-terminated PEG methacrylate monomers are copolymerized using conventional chain transfer agents to give the statistical (random) copolymers shown in the scheme below. The hydroxyl groups are then esterified to form the resulting (meth)acrylate functionalized copolymers in the same pot.

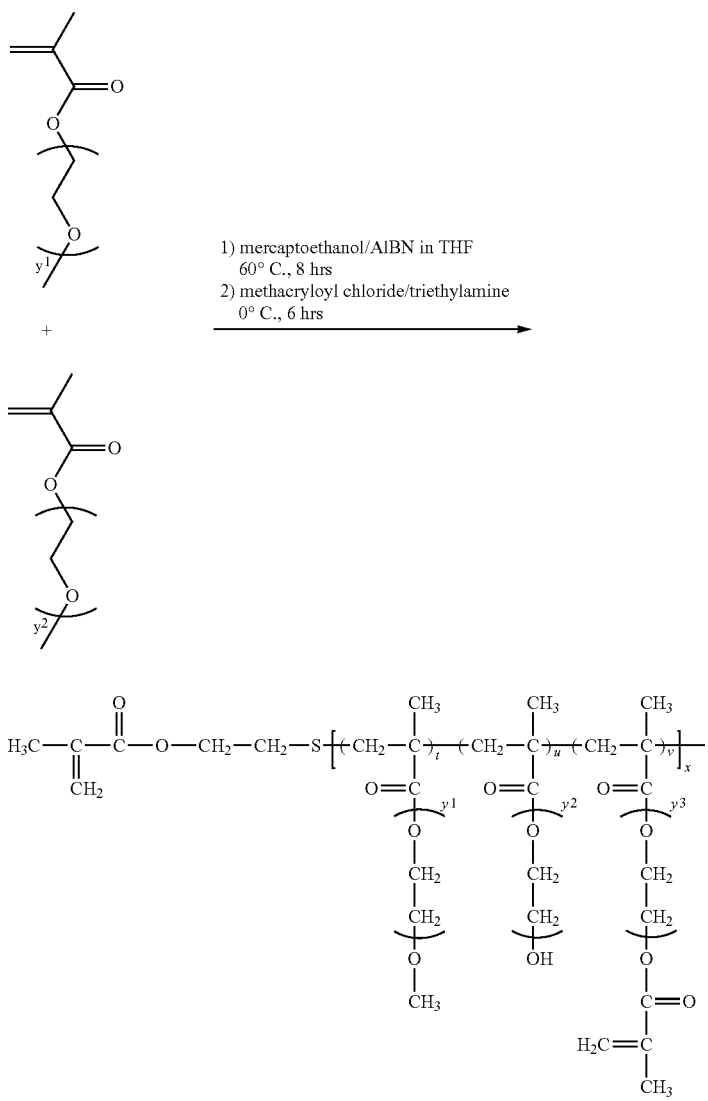

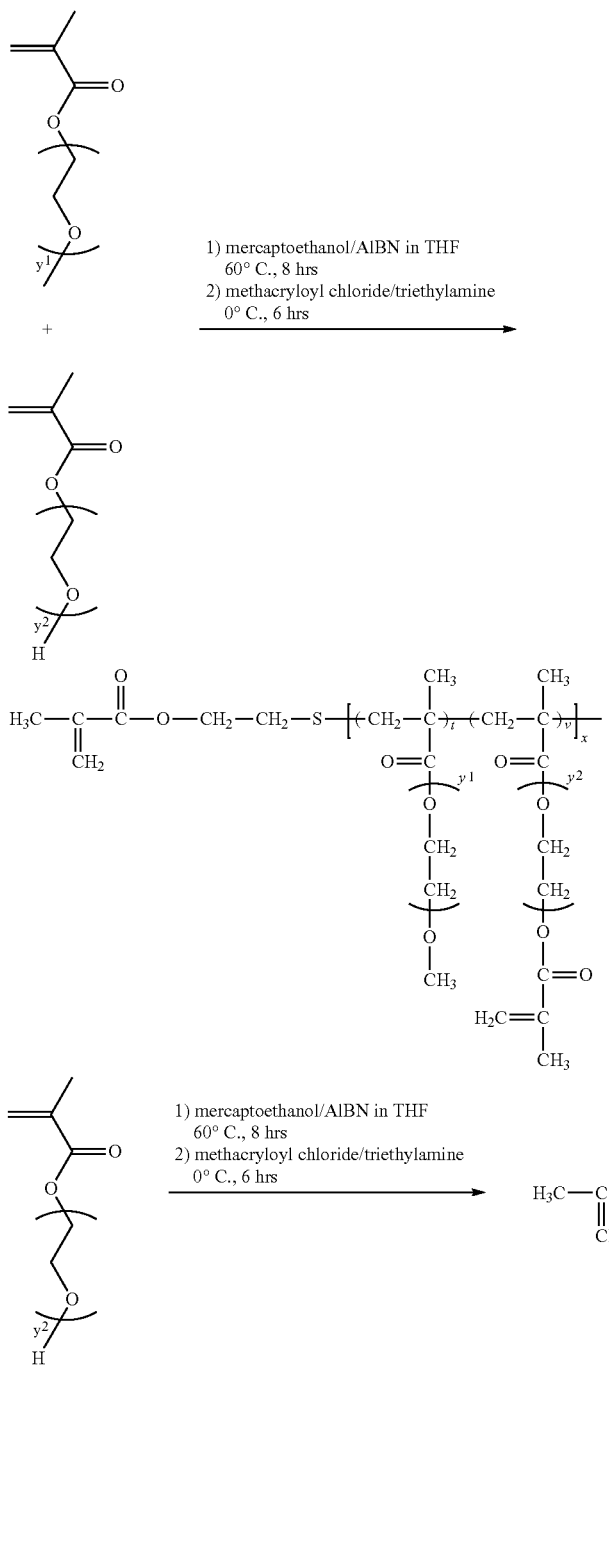

The copolymeric materials of the present invention contain a total amount of monomer [1] in an amount from 70 to 98%, preferably from 80 to 95%. The difunctional cross-linker [2] concentration can be on the order of 0.5 to 3% of the total concentration, and preferably from 1 to 2%.

The materials of the present invention have at least one copolymer additive of formula [3]. The total amount of copolymer [3] depends on the desired physical properties for the device materials. The copolymeric materials of the present invention contain a total of at least 0.5 wt % and can contain as much as 10% of copolymer additive [3]. Preferably, the copolymeric device materials will contain 1-10 wt % of the copolymer additive [3]. More preferably, the device materials will contain 1-5 wt % of the copolymer additive [3]. Most preferably, the device materials will contain 2-4 wt % of the copolymer additive [3].

The copolymeric device materials of the present invention optionally contain one or more ingredients selected from the group consisting of polymerizable UV absorbers and polymerizable colorants. Preferably, the device material of the present invention contains no other ingredients besides the monomers of formulas [1] and [2], the copolymeric additive [3], and the optional polymerizable UV absorbers and polymerizable colorants.

Reactive UV absorbers are known. A suitable reactive UV absorber is 2-(2'-hydroxy-3'-methallyl-5'-methylphenyl)benzotriazole, commercially available as o-Methallyl Tinuvin P ("oMTP") from Polysciences, Inc., Warrington, Pa. UV absorbers are typically present in an amount from about 0.1-5%. Suitable reactive blue-light absorbing compounds include those described in U.S. Pat. No. 5,470,932. Blue-light absorbers are typically present in an amount from about 0.01-0.5%. When used to make IOLs, the device materials of the present invention preferably contain both a reactive UV absorber and a reactive colorant.

In order to form the device material of the present invention, the chosen ingredients [1], [2], and [3], along with any of the optional ingredients, are combined and polymerized using a radical initiator to initiate polymerization by the action of either heat or radiation. The device material is preferably polymerized in de-gassed polypropylene molds under nitrogen or in glass molds.

Suitable polymerization initiators, include thermal initiators and photoinitiators. Preferred thermal initiators include peroxy free-radical initiators, such as t-butyl (peroxy-2-ethyl) hexanoate and di-(tert-butylcyclohexyl) peroxydicarbonate (commercially available as Perkadox® 16 from Akzo Chemicals Inc., Chicago, Ill.). Particularly in cases where the materials of the present invention do not contain a blue-light absorbing chromophore, preferred photoinitiators include benzoylphosphine oxide initiators, such as 2,4,6-trimethyl-benzoyldiphenyl-phosphine oxide, commercially available as Lucirin® TPO from BASF Corporation (Charlotte, N.C.). Initiators are typically present in an amount equal to about 5% or less of the total formulation weight, and more preferably less than 2% of the total formulation. As is customary for purposes of calculating component amounts, the initiator weight is not included in the formulation weight % calculation.

The particular combination of the ingredients described above and the identity and amount of any additional components are determined by the desired properties of the finished device material. In a preferred embodiment, the device materials of the present invention are used to make IOLs having an optic diameter of 5.5 or 6 mm that are designed to be compressed or stretched and inserted through surgical incision sizes of 2 mm or less. For example, the copolymer [3] is combined with a mono-functional acrylate or methacrylate monomer [1], a multifunctional acrylate or methacrylate cross-linker [2], a reactive UV absorber and a reactive colorant and copolymerized using a radical initiator in a suitable lens mold.

The device material preferably has a refractive index in the hydrated state of at least about 1.50, and more preferably at least about 1.53, as measured by an Abbe' refractometer at 589 nm (Na light source) and 25° C. Optics made from materials having a refractive index lower than 1.50 are necessarily thicker than optics of the same power which are made from materials having a higher refractive index. As such, IOL optics made from materials with comparable mechanical properties and a refractive index lower than about 1.50 generally require relatively larger incisions for IOL implantation.

The proportions of the monomers and macromer to be included in the copolymers of the present invention should be chosen so that the copolymer has a glass transition temperature ($T_g$) not greater than about 37° C., which is normal human body temperature. Copolymers having glass transition temperatures higher than 37° C. are not suitable for use in foldable IOLs; such lenses could only be rolled or folded at temperatures above 37° C. and would not unroll or unfold at normal body temperature. It is preferred to use Copolymers having a glass transition temperature somewhat below normal body temperature and no greater than normal room temperature, e.g., about 20-25° C., in order that IOLs made of such copolymers can be rolled or folded conveniently at room temperature. $T_g$ is measured by differential scanning calorimetry at 10° C./min., and is determined at the midpoint of the transition of the heat flux curve.

For IOLs and other applications, the materials of the present invention must exhibit sufficient strength to allow devices made of them to be folded or manipulated without fracturing. Thus the copolymers of the present invention will have an elongation of at least 80%, preferably at least 100%, and most preferably greater than 110%. This property indicates that lenses made of such materials generally will not crack, tear or split when folded. Elongation of polymer samples is determined on dumbbell shaped tension test specimens with a 20 mm total length, length in the grip area of 4.88 mm, overall width of 2.49 mm, 0.833 mm width of the narrow section, a fillet radius of 8.83 mm, and a thickness of 0.9 mm. Testing is performed on samples at ambient conditions using an Instron Material Tester (Model No. 4442 or equivalent) with a 50 Newton load cell. The grip distance is set at 14 mm and a crosshead speed is set at 500 mm/minute and the sample is pulled until failure. The elongation (strain) is reported as a fraction of the displacement at failure to the original grip distance. Since the materials to be tested are essentially soft elastomers, loading them into the Instron machine tends to make them buckle. To remove the slack in the material sample a pre-load is placed upon the sample. This helps to reduce the slack and provide a more consistent reading. Once the sample is pre-loaded to a desired value (typically 0.03 to 0.05 the strain is set to zero and the test begun. The modulus is calculated as the instantaneous slope of the stress-strain curve at 0% strain ("Young's modulus"), 25% strain ("25% modulus") and 100% strain ("100% modulus).

IOLs made of the ophthalmic device materials of the present invention are resistant to glistenings. Glistenings are measured according to the following test. The presence of glistenings is measured by placement of a lens or disk sample into a vial or sealed glass chamber and adding deionized water or a balanced salt solution. The vial or glass chamber is then placed into a water bath preheated to 45° C. Samples are to be maintained in the bath for a minimum of 16 hours and preferably 24±2 hours. The vial or glass chamber is then cooled to ambient temperature for a minimum of 60 minutes and preferably 90±30 minutes. The sample is inspected visually in various on angle or off angle lighting to evaluate clarity. Visualization of glistenings is carried out at ambient temperature with a light microscope using a magnification of 50 to 200×. A sample is judged to have many glistenings if, at 50-200× magnification, there are approximately 50 to 100% as many glistenings as observed in control samples based on 65 weight % 2-phenylethyl acrylate, 30 weight % 2-phenylethyl methacrylate, 3.2 weight % 1,4-butanediol diacrylate, and 1.8 weight % oMTP. Similarly, a sample is judged to have few glistenings if there are approximately 10% or more glistenings relative to the quantity observed in control samples. A sample is judged to have very few glistenings if there are approximately 1% or more glistenings relative to a control sample. A sample is judged to be free of glistenings if the number of glistenings detected in the eyepiece is zero. A sample is judged to be substantially free of glistenings if, at 50-200× magnification, the number of glistenings detected in the eyepiece is less than about 2/mm$^3$. It is often very difficult to detect glistenings, especially at surfaces and edges where more defects and debris have formed, so the sample is rastered throughout the entire volume of the lens, varying the magnification levels (50-200×), the aperture iris diaphragm, and the field conditions (using both bright field and dark field conditions) in an attempt to detect the presence of glistenings.

The copolymers of the present invention most preferably have an equilibrium water content (EWC) of 0.5-3.0%. EWC may be gravimetrically determined by comparison of dry and hydrated sample weight. First, the dry sample weight is obtained, then the sample is, placed in a suitable container and equilibrated in de-ionized H$_2$O at a prescribed temperature for at least 24 h. The sample is then removed from the de-ionized H$_2$O, excess surface water is removed and the sample is weighed. EWC is determined by the following formula:

$$\% \, EWC = [(wt_{hyd} - wt_{dry})/wt_{hyd}] \times 100$$

IOLs constructed of the device materials of the present invention can be of any design capable of being stretched or compressed into a small cross section that can fit through a 2-mm incision. For example, the IOLs can be of what is known as a one-piece or multi-piece design, and comprise optic and haptic components. The optic is that portion which serves as the lens and the haptics are attached to the optic and are like arms that hold the optic in its proper place in the eye. The optic and haptic(s) can be of the same or different material. A multi-piece lens is so called because the optic and the haptic(s) are made separately and then the haptics are attached to the optic. In a single piece lens, the optic and the haptics are formed out of one piece of material. Depending on the material, the haptics are then cut, or lathed, out of the material to produce the IOL.

In addition to IOLs, the materials of the present invention are also suitable for use as other ophthalmic or otorhinolaryngological devices such as contact lenses, keratoprostheses, corneal inlays or rings, otological ventilation tubes and nasal implants.

The invention will be further illustrated by the following examples, which are intended to be illustrative, but not limiting.

Example 1

Synthesis of Methacrylate Functionalized
Poly[Poly(Ethylene Glycol) Methacrylate]
Copolymer In a 250 ml 3-neck round bottom flask equipped with stir bar, condenser, and nitrogen inlet was added 38.0 g (80.0 mmol) PEG monomethyl ether methacrylate (Mn ~475, Aldrich), 6.80 g (12.9 mmol) PEG methacrylate (Mn ~526, Aldrich), 0.917 g (11.7 mmol) mercaptoethanol (Aldrich), 0.227 g (1.38 mmol) AIBN (Aldrich, recrystallized from methyl alcohol), and 100 ml THF. The mixture was purged with nitrogen for 30 minutes and then heated to reflux for 24 hours. The reaction mixture was cooled to 0° C. and 6.7 ml (48 mmol) triethylamine (Aldrich) was added followed by 2.49 g (23.8 mmol) methacryloyl chloride (Aldrich) dropwise. The reaction mixture was stirred at 0° C. for 1 hour and then ambient temperature for 4 hours. The solid was removed by filtration and the filtrate was poured into 800 ml diethyl ether. The contents were cooled to −20° C. and the liquid layer was decanted off. Precipitation into cold diethyl ether was carried out a total of 3 times to give 30 g (63%) of a yellow viscous liquid. GPC in THF using polystyrene standards gave the following molecular weight values: Mn=8,572, Mw=12,111, Mz=16953, Mp=9,143, and PDI=1.413.

Example 2

Synthesis of Methacrylate Functionalized
Poly[Poly(Ethylene Glycol) Methacrylate]
Copolymer In a 250 ml 3-neck round bottom flask equipped with stir bar, condenser, and nitrogen inlet was added 34.9 g (73.5 mmol) PEG monomethyl ether methacrylate (Mn ~475, Aldrich), 6.93 g (13.2 mmol) PEG methacrylate (Mn ~526, Aldrich), 1.84 g (23.5 mmol) mercaptoethanol (Aldrich), 0.226 g (1.37 mmol) AIBN (Aldrich, recrystallized from methyl alcohol), and 100 ml 1,4-dioxane (anhydrous, Aldrich). The mixture was purged with nitrogen for 30 minutes and then heated to 88° C. for 20 hours. The reaction mixture was cooled to 0° C. and 9.7 ml (70 mmol) triethylamine (Aldrich) was added followed by 4.11 g (39.3 mmol) methacryloyl chloride (Aldrich) dropwise. The reaction mixture was stirred at 0° C. for 1 hour and then ambient temperature for 4 hours. The solid was removed by filtration and the filtrate was poured into 800 ml diethyl ether. The contents were cooled to −20° C. and the liquid layer was decanted off. Precipitation into cold diethyl ether was carried out a total of 3 times to give 25 g (57%) of a yellow viscous liquid. GPC in THF using polystyrene standards gave the following molecular weight values: Mn=5,3811, Mw=7,105, Mz=9,172, Mp=6,592, and PDI=1.32.

Example 3

Synthesis of Methacrylate Functionalized
Poly[Poly(Ethylene Glycol) Methacrylate]
Copolymer In a 250 ml 3-neck round bottom flask equipped with stir bar, condenser, and nitrogen inlet was added 35.9 g (75.6 mmol) PEG monomethyl ether methacrylate (Mn ~475, Aldrich), 6.9 g (13 mmol) PEG methacrylate (Mn ~526, Aldrich), 1.72 g (13.8 mmol) benzyl thiol (Aldrich), 0.239 g (1.46 mmol) AIBN (Aldrich, recrystallized from methyl alcohol), and 100 ml 1,4-dioxane (anhydrous, Aldrich). The mixture was purged with nitrogen for 30 minutes and then heated to 90° C. for 20 hours. The reaction mixture was cooled to 0° C. and 5.5 ml (39 mmol) triethylamine (Aldrich) was added followed by 2.13 g (20.3 mmol) methacryloyl chloride (Aldrich) dropwise. The reaction mixture was stirred at 0° C. for 1 hour and then ambient temperature for 4 hours. The solid was removed by filtration and the filtrate was poured into 800 ml diethyl ether. The contents were cooled to −20° C. and the liquid layer was decanted off. Precipitation into cold diethyl ether was carried out a total of 3 times to give 20 g (54%) of a yellow viscous liquid. GPC in THF using polystyrene standards gave the following molecular weight values: Mn=7,600, Mw=9,600, Mz=12,500, Mp=7,860, and PDI=1.26.

Example 4

Copolymers from Examples 1-3 were formulated as shown in Table 1. Test samples measuring ~1 mm in thickness were thermally cured at 70° C. for 1 hour and 110° C. for 2 hours. Samples were extracted in refluxing acetone for 6 hours with solvent replacement every 1.5 hours. Samples were dried under ambient conditions for 20 hours, followed by vacuum (0.1 mm Hg) for a minimum of 20 hours at 70° C. Percent extractables, equilibrium water content (EWC), refractive index (R.I.), and slab appearance of hydrated samples that were equilibrated at 45° C. and then cooled to 22° C. are reported in Table 2.

TABLE 1

| Component | Example wt. % | | | |
|---|---|---|---|---|
| | 4A | 4B | 4C | 4D |
| Ex 1 | 3.14 | 0 | 0 | 0 |
| Ex 2 | 0 | 3.07 | 0 | 0 |
| Ex 3 | 0 | 0 | 3.09 | 0 |
| PEA | 73.7 | 73.7 | 73.6 | 76.0 |
| PEMA | 20.0 | 20.0 | 20.0 | 20.6 |
| BDDA | 1.51 | 1.51 | 1.51 | 1.56 |
| UV13 | 1.80 | 1.80 | 1.80 | 1.86 |
| AIBN | 0.54 | 0.54 | 0.52 | 0.57 |

TABLE 2

| Example | % Extractables (N = 6) | EWC (35° C.) (wt. %) | R.I. (35° C.) | Sample Appearance After Delta T Test | Glistenings Per Test Sample |
|---|---|---|---|---|---|
| 4A | 2.3 ± 0.1 | 1.2 | 1.5485 | [1]Clear | 0 to very few |
| 4B | 3.1 ± 0.3 | 0.8 | 1.5496 | [1]Some haze | 0 to very few |
| 4C | 2.6 ± 0.1 | 1.2 | 1.5482 | [1]Clear | 0 to very few |
| 4D | 1.8 ± 0.2 | 0.5 | 1.5537 | Hazy | many |

[1]Sample was equilibrated in deionized water for 1 day at 45° C. and then cooled to ambient temperature. Test sample was inspected using an optical microscope (100-500X) approximately 2 hours after cooling.

Example 5

Mechanical Properties

Test samples from Examples 4A-4D were tested for mechanical properties using an Instron 5543 mechanical tester. Samples from Example D contained no copolymer additive [3] and were used as a control. The mechanical testing was conducted on an Instron 5543 mechanical tester using rubber faced pneumatic grips maintained at 20 psi. Mini-dog bone sample bars were used. The grip separation was 10.5 mm and this distance was used as the sample gauge length. Movement of the upper (moveable) section of the load frame crosshead was used to determine sample strain. A testing rate of 500 mm/min was used with a preload of 0.05N to eliminate any slack in the sample prior to testing. Data was collected at a rate of 500 points/sec until failure. The maximum stress and elongation at break were recorded along with Young's modulus and the 25% and 100% secant moduli.

Six samples of each material were tested for mechanical behavior and the results averaged. The values are given in Table 3 along with ±1 standard deviation. Mechanical property results from Examples 4A-4C were statistically different from control samples (Example 4D which contained no copolymeric additive component.

TABLE 3

| Example | Stress At Break (MPa) | Strain At Break (%) | Young's Modulus (MPa) | 25% Secant Modulus (MPa) | 100% Secant Modulus (MPa) |
|---|---|---|---|---|---|
| 4A | 3.8 ± 0.5 | 160 ± 13 | 10.2 ± 0.4 | 2.76 ± 0.08 | 1.66 ± 0.06 |
| 4B | 4.2 ± 0.3 | 165 ± 5 | 11.4 ± 0.4 | 2.91 ± 0.08 | 1.65 ± 0.03 |
| 4C | 3.8 ± 0.4 | 158 ± 8 | 10.8 ± 0.7 | 2.81 ± 0.08 | 1.64 ± 0.04 |
| 4D | 4.3 ± 0.6 | 167 ± 9 | 18.8 ± 0.6 | 3.95 ± 0.13 | 1.98 ± 0.04 |

Example 6

Tack Study

Test samples from Examples 4A-4D were tested for tack. Tack was measured using a modified tensilometry test method. Samples from Example D contained no copolymeric additive [3] and were therefore used as a control. Tack testing was conducted on an Instron mechanical tester using a custom fixture for measuring the metal-polymer tack or adhesion. The fixture includes a highly polished stainless steel circular stationary pin of 8 mm in diameter that is affixed to the stationary portion of the load frame. The upper (moveable) section of the load frame crosshead is attached to a circular metal platform with a hole in the center. The moveable crosshead is lowered until the bottom pin appears through the hole in the center of the upper fixture and the crosshead movement is stopped when the pin is slightly above the metal platform. The polymer sample is then placed on the protruding pin. A fresh 10 mm diameter disk is press cut from the polymer sample and is placed on top of the protruding pin. A 300 gram weight is placed on top of the sample, pressing the sample to the pin with a uniform load. One minute after placing the weight on the sample, the Instron mechanical tester is started with a separation rate of 50 mm/min. Data is collected at a rate of 5 points/sec until the sample is pulled up off of the pin. The maximum force and area under the curve (work energy) is recorded.

Six samples of each material were tested for tack and the results averaged. The values are given in Table 4 along with ±1 standard deviation. Tack results from Examples 4A-4C were statistically different from control samples (Example 4D which contained no copolymeric additive [3] component. There was no statistically significant difference among samples from Examples 4A-4C. The molecular weight values of the polymers used in Examples 4A-4C are also shown in Table 4.

TABLE 4

| | | | | | Tack | |
|---|---|---|---|---|---|---|
| Ex. | Copolymer additive [3] | % Copolymer additive [3] | Copolymer additive [1]$M_n$ | Copolymer additive [1]$M_w$ | Copolymer [1]PDI | Max Load (N) | Energy (mJ) |
| 4A | Example 1 | 3.1 | 8,600 | 12,100 | 1.4 | 59 ± 17 | 5.6 ± 1.5 |
| 4B | Example 2 | 3.1 | 5,400 | 7,100 | 1.3 | 65 ± 17 | 6.3 ± 1.4 |
| 4C | Example 3 | 3.1 | 7,600 | 9,600 | 1.3 | 65 ± 11 | 6.0 ± 1.1 |
| 4E | None | 0 | — | — | — | 30 ± 3 | 3.4 ± 0.7 |

[1]Measured in THF relative to polystyrene standards.

This invention has been described by reference to certain preferred embodiments; however, it should be understood that it may be embodied in other specific forms or variations thereof without departing from its special or essential characteristics. The embodiments described above are therefore considered to be illustrative in all respects and not restrictive, the scope of the invention being indicated by the appended claims rather than by the foregoing description.

What is claimed is:

1. A polymeric ophthalmic or otorhinolaryngological device material comprising a) 70 to 98% (w/w) of a monofunctional monomer of formula [1]:

[Structure 1]

wherein $B=-O(CH_2)_n-$, $-(OCH_2CH_2)_n-$, $-NH(CH_2)_n-$, or $-NCH_3(CH_2)_n-$;

$R^1=H$, $CH_3$, $CH_2CH_3$, or $CH_2OH$;

$n=0-12$;

$A=C_6H_5$ or $O(CH_2)_mC_6H_5$, where the $C_6H_5$ group is optionally substituted with $-(CH_2)_nH$, $-O(CH_2)_nH$, $-CH(CH_3)_2$, $-C_6H_5$, $-OC_6H_5$, $-CH_2C_6H_5$, F, Cl, Br, or I; and $m=0-18$;

b) a difunctional cross-linking monomer of formula [2]:

[Structure 2]

wherein $R^2$, $R^3$ independently=H, $CH_3$, $CH_2CH_3$, or $CH_2OH$;

W, W' independently=$O(CH_2)_d$, $NH(CH_2)_d$, $NCH_3(CH_2)_d$, $O(CH_2)_dC_6H_4$, $O(CH_2CH_2O)_dCH_2$, $O(CH_2CH_2CH_2O)_dCH_2$, $O(CH_2CH_2CH_2CH_2O)_dCH_2$, or nothing;

J=$(CH_2)_a$, $O(CH_2CH_2O)_b$, O, or nothing, provided that if W and W'=nothing, then J ≠ nothing;

$d=0-12$;

$a=1-12$; and $b=1-24$;

and c) 0.5 to 15% (w/w) of a copolymer additive of formula [3]:

[Structure 3]

wherein for formula [3]:

D=$OCH_2CH_2S$, $SCH_2C=O$, $CH_3CH(OH)CH_2S$, $SCH_2CH(OH)CH_2O$, $S(CH_2)_{11}O$, $S(CH_2)_{10}C=O$, $S(CH_2)_{14}C=O$, $S(CH_2)_{15}C=O$, $SC_6H_4CH_2O$, $CH_3CH(S)C=O$, $S(CH_2CH_2CH_2)O$, $CH_3CH(S)CH(O)CH_3$, $OCH_2CH_2C(CH_3)_2S$, $SCH_2CH_2C=O$, $S(CH_2)_4O$, $SC_6H_4CH_2C=O$, $SC_6H_4C=O$, $S(CH_2)_{11}C=O$, $CH_3CH(O)CH(S)CH_3$, $SC_6H_4C=O$, $S(CH_2)_6OC_6H_4CH_2O$, $S(CH_2)_6O$, $S(CH_2)_5C=O$, $S(CH_2)_7C=O$, $S(CH_2)_9O$, $C(CH_3)_2C(=O)NHCH_2CH_2O$, $C(CH_3)_2C(=NH)NHCH_2CH_2C=O$, $C(CH_3)_2C(=O)NHCH(CH_2CH_3)(CH_2O)$, $C(CH_3)_2CN$, $C(CH_3)(CN)CH_2C(OCH_3)(CH_3CH_3)$, $C(CH_3)_2C(=O)NHCH_2CH=CH_2$, $C(CH_3)(CN)CH_2C(CH_3)_2(OCH_3)$, $C(CH_3)(CN)CH_2CH(CH_3)_2$, $C(CH_3)_2C(=O)OCH_3$, $C(CH_3)(CN)CH_2CH_2CH_3$, $C(CN)(CH_2)_5$, $C(CH_3)_2C(=O)NHCH_2CH_2CH_2CH_3$, or $C(CH_3)_2C(=O)NHC_6H_{11}$;

E=nothing, $O(CH_2)_nNH$, $(OCH_2CH_2)_nNH$, $O(CH_2)_nNHC=O$, $HN(CH_2)_nNH$, OH, or H; provided that if D=$C(CH_3)_2CN$, $C(CH_3)(CN)CH_2C(OCH_3)(CH_3CH_3)$, $C(CH_3)_2C(=O)NHCH_2CH=CH_2$, $C(CH_3)(CN)CH_2C(CH_3)_2(OCH_3)$, $C(CH_3)(CN)CH_2CH(CH_3)_2$, $C(CH_3)_2C(=O)OCH_3$, $C(CH_3)(CN)CH_2CH_3$, $C(CN)(CH_2)_5$, $C(CH_3)_2C(=O)NHCH_2CH_2CH_2CH_3$, or $C(CH_3)_2C(=O)NHC_6H_{11}$, then E=F=nothing;

$n=1-5$;

if D≠$C(CH_3)_2CN$, $C(CH_3)(CN)CH_2C(OCH_3)(CH_3CH_3)$, $C(CH_3)_2C(=O)NHCH_2CH=H_2$, $C(CH_3)(CN)CH_2C(CH_3)_2(OCH_3)$, $C(CH_3)(CN)CH_2CH(CH_3)_2$, $C(CH_3)_2C(O)OCH_3$, $C(CH_3)(CH)CH_2CH_3$, $C(CN)(CH_2)_5$, $C(CH_3)_2C(=O)NHCH_2CH_2CH_3$, or $C(CH_3)_2C(O)NHC_6H_{11}$ then if E=H or OH, then F=nothing;

if E≠H or OH, then F=$C(=O)C(CH_3)=CH_2$, $C(=O)CH=CH_2$, $C(=O)C(CH_2CH_3)=CH_2$, $C(=O)C(CH_2OH)=CH_2$, $C(=O)NHCH_2CH_2OC(=O)C(CH_3)=CH_2$, or $C(=O)NHC(CH_3)_2C_6H_4C(=CH_2)CH_3$;

$R^4$, $R^5$, and $R^6$ independently=H or $CH_3$;

t, u, and v represent molar fraction values and $t+u+v=1$;

t and u independently=0-0.95; provided that $t+u=0.8-0.95$;

$v=0.05-0.2$;

W=H, $CH_3$, $C(=O)C(CH_3)=CH_2$, $C(=O)CH=CH_2$, $C(=O)C(CH_2CH_3)=CH_2$, $C(=O)C(CH_2OH)=CH_2$, $C(=O)NHCH_2CH_2OC(=O)C(CH_3)=CH_2$, or $C(=O)NHC(CH_3)_2C_6H_4C(=CH_2)CH_3$; provided that if F=nothing, then W=$C(=O)C(CH_3)=CH_2$, $C(=O)CH=CH_2$, $C(=O)C(CH_2CH_3)=CH_2$, $C(=O)C(CH_2OH)=CH_2$, $C(=O)NHCH_2CH_2OC(=O)C(CH_3)=CH_2$, or $C(=O)NHC(CH_3)_2C_6H_4C(=CH_2)CH_3$;

$y^1$, $y^2$, and $y^3$ independently=4-200; and
x=1-100;
wherein the polymeric device material has an equilibrium water content of 0.5-3.0%.

2. The polymeric device material of claim 1 wherein for the monomer of formula [I]:
B=—O(CH$_2$)$_n$— or —(OCH$_2$CH$_2$)$_n$—;
R$^1$=—H or —CH$_3$;
n=1-5;
A=—C$_6$H$_5$, O(CH$_2$)$_m$C$_6$H$_5$; and
m=0-4.

3. The polymeric device material of claim 1 wherein for the monomer of formula [2]:
R$^2$, R$^3$ independently=H or CH$_3$;
W, W' independently=O(CH$_2$)$_d$, O(CH$_2$)$_d$C$_6$H$_4$, or nothing;
J=O(CH$_2$CH$_2$O)$_b$, or nothing, provided that if W and W'=nothing, then J≠nothing;
d=0-6; and
b=1-10.

4. The polymeric device material of claim 1 wherein the copolymer additive of formula [3] has a number average molecular weight (M$_n$) from 3,000 to 10,000 Daltons.

5. The polymeric device material of claim 1 wherein for the copolymer additive of formula [3]:
D=OCH2CH2S or OCH2CH2CH2S;
E=nothing, H, or OH;
if E=H or OH, then F=nothing;
if E≠H or OH, then F=C(=O)C(CH3)=CH2;
R4=R5=R6=CH3;
W=C(=O)C(CH3)=CH2;
t and u independently=0-0.95; provided that t+u=0.85-0.95;
v=0.05-0.15;
y1, y2, and y3 independently=4-20; and
x=5-50.

6. The polymeric device material of claim 5 wherein for the copolymer additive of formula [3]:
D=OCH2CH2S;
E=nothing;
F=C(=O)C(CH3)=CH2;
R4=R5=R6=CH3;
W=C(=O)C(CH3)=CH2;
t and u independently=0-0.9; provided that t+u=0.85-0.9;
v=0.1-0.15;
y=4-20; and
x=5-50.

7. The polymeric device material of claim 1 wherein the monomer of formula [1] is selected from the group consisting of benzyl methacrylate; 2-phenylethyl methacrylate; 3-phenylpropyl methacrylate; 4-phenylbutyl methacrylate; 5-phenylpentyl methacrylate; 2-phenoxyethyl methacrylate; 2-(2-phenoxyethoxy)ethyl methacrylate; 2-benzyloxyethyl methacrylate; 2-(2-(benzyloxy)ethoxy)ethyl methacrylate; 3-benzyloxypropyl methacrylate; benzyl acrylate; 2-phenylethyl acrylate; 3-phenylpropyl acrylate; 4-phenylbutyl acrylate; 5-phenylpentyl acrylate; 2-phenoxyethyl acrylate; 2-(2-phenoxyethoxy)ethyl acrylate; 2-benzyloxyethyl acrylate; 2-(2-(benzyloxy)ethoxy)ethyl acrylate; and 3-benzyloxypropyl acrylate.

8. The polymeric device material of claim 1 wherein the monomer of formula [2] is selected from the group consisting of ethylene glycol dimethacrylate; diethylene glycol dimethacrylate; triethylene glycol dimethacrylate; 1,6-hexanediol dimethacrylate; 1,4-butanediol dimethacrylate; 1,4-benzenedimethanol dimethacrylate; ethylene glycol diacrylate; diethylene glycol diacrylate; triethylene glycol diacrylate; 1,6-hexanediol diacrylate; 1,4-butanediol diacrylate; and 1,4-benzenedimethanol diacrylate.

9. The polymeric device material of claim 1 wherein the amount of monomer [1] is 80 to 95% (w/w).

10. The polymeric device material of claim 1 wherein the amount of monomer [2] is 0.5 to 3% (w/w).

11. The polymeric device material of claim 1 wherein the amount of copolymer additive [3] is 1 to 10% (w/w).

12. The polymeric device material of claim 11 wherein the amount of copolymer additive [3] is 1 to 5% (w/w).

13. The polymeric device material of claim 12 wherein the amount of copolymer additive [3] is 2 to 4% (w/w).

14. The polymeric device material of claim 1 further comprising an ingredient selected from the group consisting of a polymerizable UV absorbers and a polymerizable colorants.

15. The polymeric device material of claim 14 comprising 0.1-5% (w/w) of a polymerizable UV absorber and 0.01-0.5% (w/w) of a polymerizable colorant.

16. An ophthalmic or otorhinolaryngological device comprising the polymeric device material of claim 1 wherein the ophthalmic or otorhinolaryngological device is selected from the group consisting of intraocular lenses; contact lenses; keratoprostheses; corneal inlays or rings; otological ventilation tubes; and nasal implants.

17. The ophthalmic or otorhinolaryngological device of claim 16 wherein the ophthalmic or otorhinolaryngological device is an intraocular lens.

* * * * *